A. F. LONK.
TRAP.
APPLICATION FILED MAY 27, 1920.
1,382,298. Patented June 21, 1921.
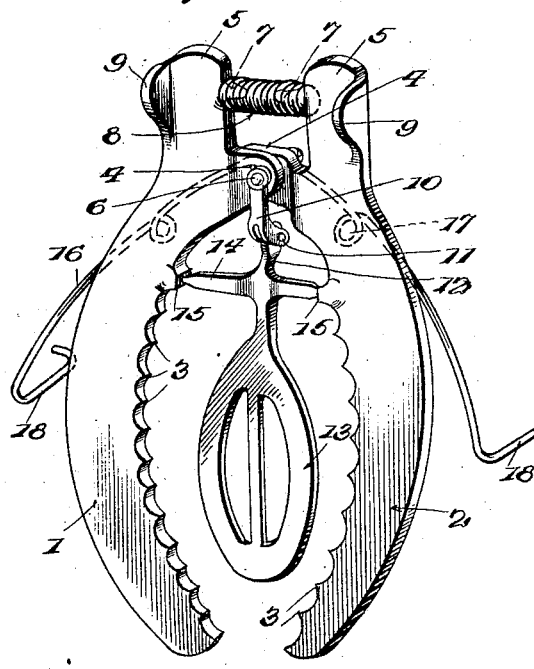
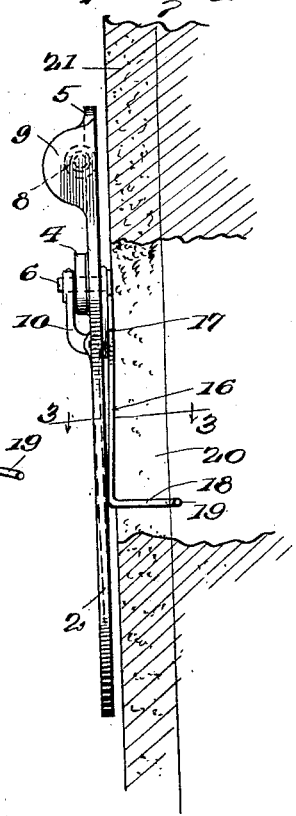
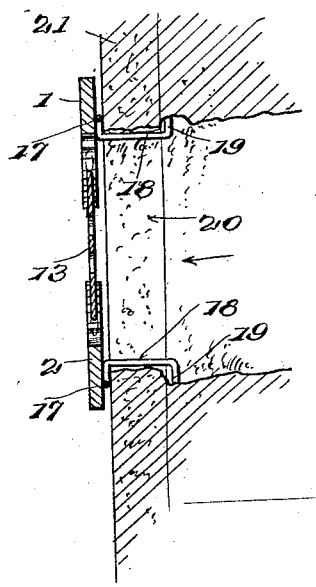
Adolph F. Lonk, INVENTOR.
BY
Lacey & Lacey, ATTORNEYS

UNITED STATES PATENT OFFICE.

ADOLPH F. LONK, OF CHICAGO, ILLINOIS.

TRAP.

1,382,298.

Specification of Letters Patent. Patented June 21, 1921.

Application filed May 27, 1920. Serial No. 384,661.

*To all whom it may concern:*

Be it known that I, ADOLPH F. LONK, a citizen of the United States, residing at Chicago, in the county of Cook and State of Illinois, have invented certain new and useful Improvements in Traps, of which the following is a specification.

This invention is a device intended more particularly for catching rats and mice but may be employed for trapping small game.

The object of the invention is to provide a trap which may be readily set at a hole through which the game is known to pass and which will be operated by the attempt of the animal to pass through the opening, the provision of bait to entice the animal being unnecessary. The invention seeks to provide a trap for the stated purpose which will be simple in construction and easily manipulated and firmly supported in position where set.

The invention is illustrated in the accompanying drawings, in which—

Figure 1 is a perspective view of one embodiment of the invention;

Fig. 2 is an edge view of the trap showing the same in position for use;

Fig. 3 is a horizontal section on the line 3—3 of Fig. 2.

In carrying out my invention, I provide two similar mating members which, when assembled, will present opposed jaws 1 and 2, the inner edges of which are preferably concave and serrated or provided with teeth 3. Above the concave roughened edges of these jaws, upon each member, is a lateral lug 4 and above the said lug is an arm 5. The lugs 4 overlap and receive a pivot 6 which may be of any convenient form and on the inner opposed edges of the arms 5 are bosses or studs 7 which form holders for the ends of a coiled spring 8 tending constantly to expand and thereby throw the arms 5 apart. On the front face of each arm 5, at the outer edge thereof, is a lug 9 which constitutes a finger hold whereby the jaws may be spread apart against the tension of the spring 8 when setting the trap. On one end of the pivot 6 is secured a hanger 10 which may be of any preferred form and depends from the pivot to the space between the jaws and has its lower end turned laterally so as to extend into said space, as shown at 11. Pivoted to the lower end of the hanger is the upper end of a trip 12 which has its lower end expanded to form a presser plate 13 substantially filling or blocking the opening between the jaws, as shown clearly in Fig. 1. Near the upper end of the trip, I provide a cross bar 14 which has its ends adapted to rest upon lugs 15 formed on the inner opposed edges of the jaws above the serrated portions thereof, as clearly shown in Fig. 1. It will be readily understood that the spring 8, tending to spread the arms 5, throws the jaws 1 and 2 toward each other so that the lugs or abutments 15 on the jaws will bear firmly against the ends of the cross bar 14 which will, consequently, hold the jaws in the open position. Upon the end of the pivot 6 remote from the hanger 10, I mount a bow spring 16 which extends to the opposite sides of the said pivot and is provided, between its ends and the pivot, with coils 17, the ends of the spring being bent laterally, as shown at 18, to pass through the opening in which or at which the trap is to be set and then being bent at right angles, as shown at 19, to form retaining spurs.

The use and operation of the trap will, it is thought, be readily understood from the foregoing description, taken in connection with the accompanying drawings. The trap is illustrated for use at an opening or hole 20 formed in a wall 21. To set the trap, the ends of the spring 16 are forced together so that the lateral extremities of the spring may pass through the opening 20 and the spurs 19 engage in the wall at the rear of the plaster or be embedded in the sides of the opening. The major portion of the spring will then extend over the opening and the members 1 and 2 of the trap will be supported at the sides of the opening with the presser plate 13 of the trip obstructing the passage through the opening. In bringing the jaws 1 and 2 into proper engagement with the cross bar 14 of the trip, the operator presses upon the lugs 9 so as to compress the spring 8 and then swings the trip about its pivotal connection with the hanger 10 so that the cross bar 14 will be brought into alinement with the lugs or recesses 15. When the pressure upon the lugs 9 is released the spring 8 will expand and the lugs 15 will engage the ends of the cross bar 14 so that the parts will be held together. If an animal should attempt to pass through the opening 20 in accordance with his usual custom, his head will meet the presser plate 13 which obstructs the entire opening and said plate will be swung outwardly so as to withdraw the cross bar 14 from between the lugs 15 whereupon the spring 8 will immediately expand and throw the jaws 1 and 2 together. The said jaws will engage around the neck of the animal and firmly hold him, as is obvious. The jaws 1 and 2 should be formed upon such arcs that the trap will be capable of catching and holding a large rat or a small mouse, it being readily understood that the lower free ends of the jaws are in different planes so that the jaws may assume an overlapping relation when released from the cross bar 14. The spring 16 will effectually support the device in position for use and the operation, when released by an animal, is certain and efficacious. The device is exceedingly simple in the construction and arrangement of its parts and may be manufactured at a very low cost.

Having thus described the invention, what is claimed as new is:

1. A trap comprising a pair of pivotally connected jaws, a trip normally holding the jaws apart, means for moving the jaws together when released by the trip, and a supporting spring fitted midway its ends upon the pivotal connection between the jaws and having its extremities bent laterally and then turned at a right angle to form retaining spurs whereby to support the trap adjacent an opening.

2. A trap comprising pivotally connected jaws provided on their opposed edges near their pivotal connection with inwardly projecting lugs, a hanger suspended on the pivotal connection between the jaws and depending into the space between the same, and a trip pivotally suspended on said hanger and arranged to normally engage the lugs on the jaws.

3. A trap comprising a pair of jaws provided on their inner edges with overlapping lugs, a pivot inserted through said lugs, means acting on the jaws above the pivot to yieldably hold the jaws together, a hanger suspended upon the pivot and depending into the space between the jaws, a trip carried by the hanger and constructed to obstruct the space between the jaws and engaging the inner opposed edges of the same below the pivot to hold them normally apart, and means carried by the pivot for supporting the trap in a set position.

In testimony whereof I affix my signature.

ADOLPH F. LONK. [L. S.]